Nov. 26, 1957 R. D. FRANS 2,814,202
TEMPERATURE INDICATOR FOR INFANTS' NURSING BOTTLES
Filed July 25, 1955
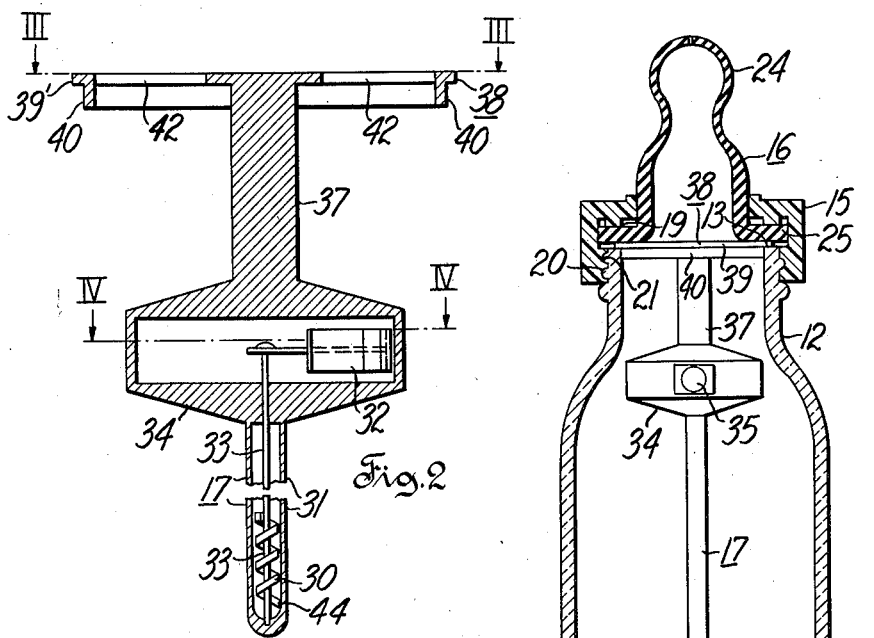
Fig.1
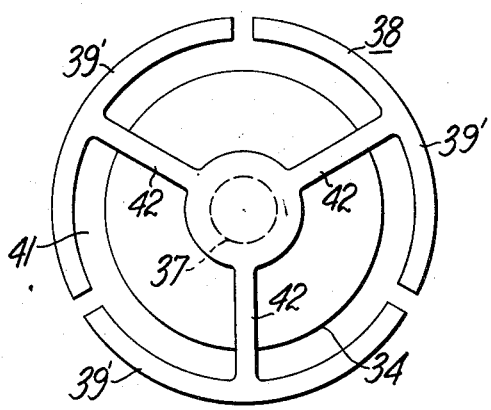
Fig.2
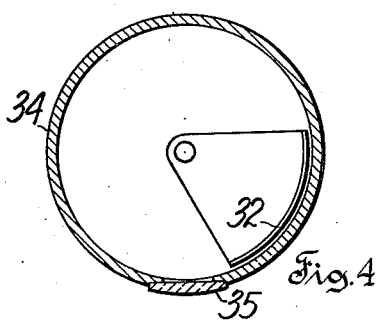
Fig.3
Fig.4
Inventor
Robert D. Frans
by Richard R. Mybeck
Attorney United States Patent Office 2,814,202
Patented Nov. 26, 1957

2,814,202

TEMPERATURE INDICATOR FOR INFANTS' NURSING BOTTLES

Robert D. Frans, Milwaukee, Wis.

Application July 25, 1955, Serial No. 524,215

8 Claims. (Cl. 73—343)

This invention relates generally to new and useful improvements in infants' nursing bottles and more particularly to means for conveniently determining the temperature of the contents of such bottles sanitarily and accurately.

Infants' nursing bottles embodying temperature indicating means for determining the temperature of the contents of the bottle have been previously proposed. One such device comprised in combination a conventional nursing bottle and a conventional mercury thermometer detachably affixed to the external surface of the bottle. A disadvantage of this device is that it does not measure the true temperature of the contents of the bottle but rather it indicates the temperature of the atmosphere surrounding the thermometer bulb including that portion of the external wall of the bottle with which it is in contact. Obviously, such a measurement is subject to inaccuracy and in an operation as important as determining the proper temperature of an infant's food, "pretty close" is not close enough.

A second prior art device comprises a temperature indicating means disposed within the thickness of the wall of the bottle, i. e., a thermometer encased between the internal and external walls of the nursing bottle. This device is likewise subject to error in measuring the true temperature of the contents of the bottle. An additional shortcoming of this device is that the bottle is difficult and, consequently, expensive to produce. A further disadvantage is that the operation of sterilizing the bottle requires temperatures quite out of the range of that desired for baby feeding. The thermometer, being integrally formed with the bottle, needs a temperature range including both the sterilization temperature and the feeding temperature if "blowing out" during sterilization is to be avoided. By "blowing out" is meant the expansion of the mercury in a mercury thermometer beyond the glass tube within which the mercury is enclosed resulting from exposing the thermometer to temperatures beyond its designed range. A "safe" thermometer, i. e., one which will not blow out, requires such a large range that accuracy of measurement is sacrificed. A further disadvantage of this type device is that if an accident occurs which breaks the bottle, such as dropping in a sink or being cast from a crib, the thermometer is also lost. The unit is therefore both fragile and expensive to replace.

A third prior art device comprises in combination a nursing bottle, a nipple, and a cap having a thermometer mounted therein with its temperature sensitive element extending through an aperture in the nipple and into the bottle. A disadvantage of this device is that special nipples and bottle caps are required to render the device useful. It is not adaptable to conventional nursing equipment without additional auxiliary equipment.

Accordingly, it is one of the primary objects of this invention to provide a new and improved means for measuring and indicating the temperature of the contents of an infant's nursing bottle which obviates the aforementioned disadvantages of the prior art.

A further object of the present invention is to provide a temperature indicating means which accurately reflects the true temperature of the contents of an infant's nursing bottle.

A still further object of the present invention is to provide a means for measuring and indicating the temperature of the contents of an infant's nursing bottle which means is cheaply manufactured, easily carried, quickly sterilized, interchangeable with standard nursing bottles, shock resistant, and conveniently used.

An additional object of this invention is to provide an improved means for measuring and indicating the temperature of the contents of an infant's nursing bottle which will always indicate the temperature of the contents of the bottle accurately and which avoids special construction of the bottle, the nipple and the cap.

Another object of the present invention is to provide a device of the character described which is adapted for application to existing forms of infants' nursing bottles in such a manner as not to interfere or obstruct the flow of fluid from the bottle in response to an infant's sucking.

Another object of the present invention is to provide a device of the character described in which the temperature indicating means is in the form of an immersion type thermometer having a tube of stainless steel or like material for sanitation and sterilization enclosing a bimetal coil and carried by a suspension member interposable between the bottle and its cap to be positioned within the nursing bottle and in contact with the contents thereof.

A still further object of the present invention is to provide an improved means for measuring and indicating the temperature of the contents of an infant's nursing bottle having various features of novelty and advantages, and which is particularly characterized by its simplicity in construction, its economy in manufacture and its effectiveness in use.

Further objects and advantages of the invention will appear from the following detailed description, taken in connection with the accompanying drawing which illustrates the manner of constructing and using an exemplary embodiment of the invention.

In the drawing, like numbers refer to like members in the several views.

In the drawing:

Fig. 1 is a vertical section view partially in elevation showing one embodiment of the present invention;

Fig. 2 is an enlarged fragmentary detail sectional view showing the temperature indicating means of the present invention;

Fig. 3 is a view taken across line III—III of Fig. 2; and

Fig. 4 is a sectional view taken across line IV—IV of Fig. 2.

Referring now to the drawing, the numeral 11 denotes a container for fluid such as an infant's nursing bottle formed of glass or other suitable material and provided with a neck 12 defining the mouth or opening 13 of bottle 11.

Bottle 11 may be of any existing or other suitable form and it is a feature of this invention to utilize a detachable closure or clamping ring 15 adapted for application to any existing form of infant's nursing bottle.

Bottle 11 may be provided with any suitable means for the extraction of the fluid contained therein such as nipple 16 shown in Fig. 1 secured to mouth 13 of bottle 11 by clamping ring 15.

It is another feature of this invention to provide a temperature indicating means 17 which is formed independently of all portions of the bottle assembly and which is readily insertable in and removable from any existing or other suitable form of infant's nursing bottle.

Thus is provided an infant's nursing bottle combination comprising a bottle 11, a clamping ring 15, a nipple 16 and a temperature indicating means 17, each of which are adaptable for independent removal from the combination for handling and sterilization when desired.

Ring 15 is shown with an integral annular flange 19 provided with internal thread means 20 for screw-on engagement with cooperating external thread means 21 on neck 12 of bottle 11. It is understood, however, that ring 15, instead of being of the screw-on type as is illustrated in the drawing, may be of the slip-on or of any other suitable type. Ring 15 may be molded of a plastic material, such as bakelite, or formed of any other suitable material.

Nipple 16 is shown having a teat simulating portion 24 and a flange portion 25 disposed circumferentially thereof. It is understood, however, that nipple 16 may be of any existing or other suitable form. Nipple 16 may be made of rubber or any other suitably resilient material.

Temperature indicating means 17, as illustrated, comprises a thermally responsive or temperature sensitive element, for example, bimetallic coil 30 enclosed within a tubular member formed of a material of the character of stainless steel, such as tube 31, an indicator dial 32 responsively connected to an indicator shaft 33 which in turn is responsively connected to bimetallic coil 30. Indicator dial 32 is enclosed within a suitable housing means, such as indicator housing 34, which is provided with suitable means for visually observing indicator dial 32, such as glass or transparent outwardly opening viewing window 35. Tube 31 enclosing bimetallic coil 30 has its outer end built or molded into housing 34 and is sealed against entry of the contents of the bottle 11 into the tube 31 where such contents might deleteriously affect the bimetallic coil 30.

Indicator dial 32 is suitably inscribed with markings for indicating the temperature range of the liquid contained within bottle 11 acting upon bimetallic coil 30 such as red, with or without a legend, indicating "too hot," blue, with or without a legend, indicating "too cold," and green, with or without a legend, indicating "just right." Any suitable arrangement of colors, symbols, legends, degrees or any of the various combinations of these or any other suitable means can be used to indicate the temperature of the contents of the bottle within the purview of the present invention. Likewise, a standard may also be included on the dial which is indicative of a known thermal characteristic of a household material, e. g., the boiling point of water, to provide a ready means for checking the accuracy of the indicator dial calibration during its life, after it has been dropped, etc.

It is further understood that the bimetallic coil herein described is used for exemplary purposes and any substantially equivalent thermally responsive element is intended to be embraced within the scope of the present invention.

Temperature indicating means 17 is held in position within bottle 11 by a supporting arrangement comprising a supporting stem 37 and a suspension member 38. Suspension member 38 as illustrated comprises a supporting portion which may be an annular portion 39, as shown in Fig. 1, or a plurality of coaxial arcuate portions 39', 39', 39', as shown in Figs. 2 and 3, or any equivalent configuration defining an opening 41 in register with the opening or mouth 13 defined by neck 12 of bottle 11, a depending flange portion 40 insertable within mouth 13 for restricting the lateral movement of temperature indicating means 17 relative to bottle 11, and a plurality of substantially radially extending rigid truss members 42, 42, 42 (see Fig. 3) interposed between arcuate portions 39', 39', 39' and supporting stem 37 in such a manner to subdivide opening 41. Truss members of any suitable shape may be incorporated into suspension member 38 to effect the subdivision of opening 41 defined by truss members 42, 42, 42 and annular portion 39 (arcuate portions 39', 39', 39'), for it is a feature of the present invention that when temperature indicating means 17 is cooperatively secured by ring 15 and bottle 11, the fluid contained in bottle 11 will flow out through opening 41 and nipple 16 without any substantial interference being provided by truss members 42, 42, 42. Likewise, the truss members 42, 42, 42 can obviously be disposed angularly from annular element 39 down to supporting stem 37 for accommodating an inverted nipple such as is utilized by certain of the nursing bottles which are commercially available.

In operation, a quantity of liquid is disposed within any bottle 11. Temperature indicating means 17 is inserted within bottle 11 through opening 13 until suspension member 38 rests on top of container 11. Clamping ring 15 is then placed on bottle 11 and made fast so as to clamp suspension member 38 securely between ring 15 and bottle 11. The fluid, if cool, is then heated. The heat of the fluid reacts on bimetallic coil 30, which is secured to tube 31 at a junction 44, causing it to coil or uncoil, depending on the nature of the bimetallic adopted, which causes indicator shaft 33 to respond with like motion thereby turning dial 32 and presenting the temperature indicating markings in window 35 of housing 34. Upon the appearance of the proper temperature indication in window 35, heat is removed from the bottle and the contents of the bottle are ready for infant feeding.

In use, the temperature indicating means makes it possible to maintain liquid infants' foods within the bottle at the desired feeding temperature (i. e., the normal body temperature of 98.6° F.) at all times, and the feeding of an infant with liquid food which is either too hot or too cold is avoided. The tissues of the mouth, throat and stomach of an infant are tender, and colic and various stomach disorders have resulted from feeding liquid foods which were either too hot or too cold. Guesswork and haphazard methods of determining temperature of baby food, such as by squirting some of the liquid on a sensitive portion of the arm or wrist, is likewise avoided.

It is understood that the embodiment of the invention herein described and illustrated is exemplary only and is not intended in any manner to limit the scope of this invention which is to be limited only by the appended claims.

Having thus described my present invention, I claim and desire to secure by Letters Patent:

1. An article of manufacture comprising in combination an infant's nursing bottle having an opening defining portion in the top thereof; a nipple having a flange circumferentially thereof resting on the opening defining portion of said bottle and circumscribing said opening; a temperature indicating means extending into said bottle through said opening and having a suspension member in abutting relation to said bottle interposed between said flange of said nipple and said bottle, said suspension member comprising an annular element, a stem depending from said annular element and generally normal to the plane defined thereby, and a plurality of truss members interposed between said stem and said annular element for joining said annular element to said stem; and a detachable clamping ring for rigidly securing said flange of said nipple and said annular element of said suspension member to said bottle.

2. An article of manufacture comprising in combination: a container having an opening defined therein; a temperature indicating means extending axially into said container through said opening and having a suspension member integral therewith supported by said container, said suspension member comprising a plurality of diverging trusses joined by a plurality of coaxial arcuate flange portions cooperating with said opening in such a manner to prevent the further extension of said indicating means into said container, said coaxial arcuate flange portions being in intimate contact with said container; and a detachable clamping ring for rigidly securing said flange portions of said suspension member of said indicating means to said container.

3. An article of manufacture comprising in combination: a container for fluids having an opening defined therein; a detachable clamping ring for closing said opening in said container; and a temperature indicating means extending into said container through said opening and secured to said container by said ring, said temperature indicating means comprising a thermally responsive element, an indicator shaft responsively linked to said thermally responsive element and adjacent thereto, an indicator dial responsively linked to said shaft and adjacent thereto, said dial being reflective of said element, a housing means surrounding said dial, said shaft and said thermally responsive element and having a window disposed therein to visually expose said dial, said window being disposed in said container in spaced relationship to the fluid contained therein, a supporting stem contiguous with said housing and extending therefrom, and a suspension member for positioning said thermally responsive element, said indicator shaft, said indicator dial, said housing means and said supporting stem within said container, said supporting stem being interposed between said suspension member and said housing means, said suspension member having a plurality of coaxial arcuate portions interposed between said container and said ring in intimate contact therewith, and a plurality of truss members interposed between said stem and said arcuate portions for joining said arcuate portions to said supporting stem.

4. For use with a bottle having an opening defined in the top thereof, and a closure for the bottle having means for being detachably secured to the bottle, an improved temperature indicating means comprising: a thermally responsive element; an indicator shaft responsively linked to said thermally responsive element and adjacent thereto; an indicator dial responsively linked to said shaft and adjacent thereto, said dial being reflective of the temperature surrounding said element; a housing means surrounding said dial, said shaft, and said thermally responsive element and defining a viewing window for visually exposing said dial, said window being disposed in said container in spaced relationship to the fluid contained therein; a supporting stem contiguous with said housing and extending therefrom; and a suspension member cooperating with the bottle and the closure for securing said thermally responsive element, said indicator shaft, said indicator dial, said housing means and said supporting stem within said bottle, said supporting stem being interposed between said suspension member and said housing means, said suspension member having an annular portion interposed between the container and the closure in intimate contact therewith, a flange portion depending from said annular portion insertable within the opening of the bottle for restricting the lateral movement of the temperature indicating means relative to the bottle, and a plurality of truss members interposed between said annular portion and said supporting stem for joining said annular portion to said supporting stem.

5. An article of manufacture according to claim 4 in which said annular portion of said suspension member comprises a plurality of coaxial arcuate portions.

6. An article of manufacture comprising in combination: a fluid container having an opening defined therein; a detachable clamping ring for closing said opening in said container; and temperature indicating means extending into said container through said opening and secured to said container by said ring, said temperature indicating means comprising an element responsive to the thermal condition of the fluids in said container, an indicator dial responsively linked to said element and in spaced relationship thereto for providing an observable indication of the condition to which said element is responsive, a supporting stem contiguous with said dial and extending therefrom, and a suspension member for positioning said element, said dial, and said stem within said container, said supporting stem being interposed between said suspension member and said dial, said suspension member having a plurality of coaxial arcuate portions interposed between said container and said ring and secured thereby and a plurality of diverging truss members interposed between said supporting stem and said portions for joining said portions to said stem.

7. An article of manufacture comprising in combination: a fluid container having an opening defined therein; a temperature indicating means extending into said container through said opening and having a suspension member attached thereto in abutting relationship to said container, said suspension member comprising an annular element substantially in register with said opening, a stem depending downwardly from said annular element, and a plurality of trusses interposed between said stem and said annular element and converging upon said stem for joining said annular element to said stem; and a detachable clamping ring for securing said annular element to said container.

8. An article of manufacture comprising in combination: a fluid container having an opening defining portion at the top thereof; temperature indicating means extending into said container through said opening and having a suspension member in abutting relationship to said opening defining portion of said container, said suspension member comprising an annular element having a flange portion defined thereon extending downwardly therefrom into substantially concentric relationship with said opening defining portion of said container and cooperatively coacting therewith to restrict the lateral movement of said suspension member relative to said container, said suspension member further comprising a stem depending axially downwardly from said annular element and a plurality of truss members interposed between said stem and said annular element and converging upon said stem for connecting said annular element to said stem; and a detachable clamping ring for securing said suspension member to said container.

References Cited in the file of this patent

UNITED STATES PATENTS

| | | |
|---|---|---|
| 2,240,070 | Geyer | Apr. 29, 1941 |
| 2,293,475 | Serra | Aug. 18, 1942 |
| 2,483,979 | Morrill | Oct. 4, 1949 |
| 2,648,226 | Finch | Aug. 11, 1953 |
| 2,755,665 | Muncheryan | July 24, 1956 |

FOREIGN PATENTS

| | | |
|---|---|---|
| 29,516 | France | Aug. 22, 1925 |